United States Patent [19]

Matsui et al.

[11] Patent Number: 4,804,589
[45] Date of Patent: Feb. 14, 1989

[54] SILICON CARBIDE SINTERED MEMBERS

[75] Inventors: Minoru Matsui, Nagoya; Tomonori Takahashi, Chita, both of Japan

[73] Assignee: NGK Insulators, Ltd., Nagoya, Japan

[21] Appl. No.: 113,351

[22] Filed: Oct. 29, 1987

Related U.S. Application Data

[63] Continuation of Ser. No. 905,142, Sep. 9, 1986, abandoned.

[30] Foreign Application Priority Data

Sep. 26, 1985 [JP] Japan ................................ 60-213494

[51] Int. Cl.⁴ .......................... B32B 9/04; B32B 13/16
[52] U.S. Cl. .................................... 428/698; 428/699; 428/701
[58] Field of Search ................ 427/309; 428/325, 698, 428/699, 701, 469, 408

[56] References Cited

U.S. PATENT DOCUMENTS

| | | |
|---|---|---|
| 2,707,691 | 3/1955 | Wheildon, Jr. . |
| 2,876,121 | 3/1959 | Ault . |
| 3,325,303 | 6/1967 | Lant et al. ............................ 428/325 |
| 3,953,636 | 4/1976 | Kirchner ........................ 428/698 X |
| 3,977,061 | 8/1976 | Lindstrom et al. ............. 428/698 X |
| 4,055,705 | 10/1977 | Stecura . |
| 4,109,050 | 8/1978 | Mehan et al. ................... 427/309 X |
| 4,288,495 | 9/1981 | Terner et al. . |
| 4,310,481 | 1/1982 | Baney . |
| 4,357,382 | 11/1982 | Lambert et al. ................ 428/698 X |
| 4,409,003 | 10/1983 | Sarin et al. . |
| 4,424,086 | 1/1984 | Kumagai . |
| 4,507,189 | 3/1985 | Doi et al. ........................ 427/309 X |
| 4,515,860 | 5/1985 | Holzl . |
| 4,608,326 | 8/1986 | Neukermans et al. . |
| 4,634,635 | 1/1987 | Shiraishi et al. . |

FOREIGN PATENT DOCUMENTS

| | | |
|---|---|---|
| 1058422 | 11/1957 | Fed. Rep. of Germany . |
| 60-224783 | 11/1985 | Japan . |
| 1560793 | 5/1976 | United Kingdom . |

*Primary Examiner*—Nancy A. B. Swisher
*Attorney, Agent, or Firm*—Parkhurst, Oliff & Berridge

[57] ABSTRACT

A silicon carbide sintered member is coated at its surface with zirconia, whereby the heat insulating properties are considerably improved.

14 Claims, No Drawings

SILICON CARBIDE SINTERED MEMBERS

This is a continuation of application Ser. No. 905,142 filed Sept. 9, 1986 now abandoned.

BACKGROUND OF THE INVENTION

1. Field of the Invention

This invention relates to silicon carbide sintered members having improved heat insulating properties, and more particularly to a silicon carbide sintered member having a low thermal conductivity in the vicinity of its surface coated with zirconia.

2. Related Art Statement

The silicon carbide sintered members are superior in the high-temperature mechanical strength, heat resistance, corrosion resistance and so on to the other inorganic materials and metals, so that they are considered to be utilized as a high-temperature structural member, and the development for applications thereof is proceeding widely.

However, the silicon carbide sintered member has drawbacks that the thermal conductivity is high and the heat insulating properties are poor. For instance, when the silicon carbide sintered member is applied to a wall face of an engine combustion chamber for enhancing the heat resistance of this chamber, the heat insulating properties against exterior can be improved by making the air gap or the like, but air supplied into the inside of the room is warmed due to high thermal conductivity to provide no effective inlet gas quantity. In this case, the high thermal conductivity near the surface of the silicon carbide sintered member comes into problem.

In order to improve heat resistance, corrosion resistance and wear resistance, the application of zirconia to a surface of a metal as a substrate through plasma spray coating is disclosed in Japanese Patents laid open Nos. 55-28,351, 57-140,876 and 58-87,273. Furthermore, Japanese Patents laid open Nos. 57-135,771 and 58-125,679 disclose the coating of zirconia onto the surface of carbon substrate. However, there is no example aiming at the improvement of heat insulating properties near the surface of silicon carbide sintered member as a substrate.

The zirconia is low in the thermal conductivity and excellent in the heat insulating properties as compared with the silicon carbide sintered member, but has a drawback that the high-temperature mechanical strength is low.

SUMMARY OF THE INVENTION

It is an object of the invention to solve the aforementioned drawbacks by applying zirconia to the surface of the silicon carbide sintered member to form a heat insulating layer.

According to the invention, the silicon carbide sintered member, which is high in the high-temperature strength and the thermal conductivity and poor in the heat insulating properties, is coated at its surface with zirconia having a low thermal conductivity, whereby the heat insulating properties near the surface thereof are improved.

DETAILED DESCRIPTION OF THE INVENTION

The term "silicon carbide sintered member" used herein means structural members such as engine parts and the like made from pressureless sintered body, gas pressured sintered body, hot press sintered body, HIP sintered body or reaction sintered body of silicon carbide. Although the silicon carbide sintered member may contain various additives such as B, C, Be, Al and so on, the presence of the additive is not a substantial problem in view of the improvement of heat insulating properties in the silicon carbide sintered member according to the invention. In the invention, the surface of the silicon carbide sintered member is coated with zirconia. In this case, zirconia fully or partially stabilized by $Y_2O_3$, MgO or CaO is used. The thickness of the zirconia layer is preferably not more than 100 $\mu$m because the thermal expansion coefficient is different between the silicon carbide sintered member and zirconia so that the peeling or crazing is apt to be caused by the repetition of heating and cooling. Further, the thickness less than 100 $\mu$m is sufficient to effectively reduce the thermal conductivity near the surface of the sintered member.

The production method of the silicon carbide sintered member coated with zirconia according to the invention will be described below. According to the invention, the surface of the silicon carbide sintered member is wholly or partially coated with a zirconia layer by applying or spraying a zirconia slurry to the surface of the sintered member and then firing to the zirconia coated layer, or preferably applying zirconia through plasma spray coating. Since the surface of the silicon carbide sintered member has generally a fired or machined face, it is necessary to perform a treatment for surface roughening or reactivity enhancement in order to increase the bonding force to zirconia fired layer or spray coated layer. Such a treatment is, for example, a polishing with abrasive grits, an oxidation by heating in air, an etching through alkali molten salt or the like. The treatment for surface roughening or reactivity enhancement is required to be properly determined by the quality of the silicon carbide sintered member. Furthermore, the fully or partially stabilized zirconia may be used as a starting material for the formation of zirconia layer, or zirconia may be reacted with a stabilizing agent during the firing or spray coating to form the stabilized zirconia layer. Moreover, an intermediate layer having a middle thermal expansion coefficient may be previously formed in order to prevent the peeling or crazing due to the difference in the thermal expansion coefficient between the silicon carbide sintered member and zirconia.

The following examples are given as the illustration of the invention and are not intended as limitations thereof.

EXAMPLE 1

A disc of 10 mm in diameter and 3 mm in thickness was made from a silicon carbide pressureless sintered body containing B and C and oxidized in air at 1,500° C. for 100 hours to form an oxide layer on the surface thereof, which was used as a substrate for plasma spray coating. The one side of the substrate was subjected to a plasma spray coating with a spray coating agent shown in the following Table 1 at a thickness of 50–70 $\mu$m, whereby samples 1, 2 and 3 were obtained for the measurement of thermal conductivity of silicon carbide sintered member according to the invention. The thermal conductivity was measured at room temperature and 800° C. by a laser flash process with respect to the samples 1, 2 and 3 together with a substrate coated with no zirconia as Comparative Example 4 to obtain results as shown in Table 1. In this case, the measurement of thermal conductivity in the samples 1-3 through the laser flash process was performed by irradiating a laser to the coated surface.

TABLE 1

| Sample | No. | Spray coating agent | Thermal conductivity (cal/cm · sec · °C.) room temperature | 800° C. |
|---|---|---|---|---|
| Invention product | 1 | 24 wt % MgO—ZrO$_2$ | 0.06 | 0.04 |
| Invention product | 2 | 20 wt % Y$_2$O$_3$—ZrO$_2$ | 0.05 | 0.03 |
| Invention product | 3 | 5 wt % CaO—ZrO$_2$ | 0.06 | 0.04 |
| Comparative Example | 4 | no coating of ZrO$_2$ | 0.14 | 0.10 |

In the products 1, 2 and 3 according to the invention, the peeling or crazing was not caused even by repeating the heating at 1,200° C. and the cooling to room temperature 20 times.

EXAMPLE 2

A disc of 10 mm in diameter and 3 mm in thickness was made from a silicon carbide pressureless sintered body containing B and C, and subjected to a surface etching by immersing in a molten salt consisting of 90% of potassium hydroxide and 10% of potassium nitrate to form a substrate for plasma spray coating. The one side of the substrate was subjected to a plasma spray coating with a spray coating agent shown in the following Table 2 at a thickness of 50-70 μm to obtain samples 5 and 6 for the measurement of thermal conductivity in the silicon carbide sintered member according to the invention. The thermal conductivity was measured by the same method as described in Example 1 with respect to the samples 5 and 6 together with a substrate coating no zirconia as Comparative Example 7 to obtain results as shown in Table 2.

TABLE 2

| Sample | No. | Spray coating agent | Thermal conductivity (cal/cm · sec · °C.) room temperature | 800° C. |
|---|---|---|---|---|
| Invention product | 5 | 24 wt % MgO—ZrO$_2$ | 0.06 | 0.04 |
| Invention product | 6 | 20 wt % Y$_2$O$_3$—ZrO$_2$ | 0.05 | 0.04 |
| Comparative Example | 7 | no coating of ZrO$_2$ | 0.14 | 0.10 |

In the products 5 and 6 according to the invention, the peeling or crazing was not caused even by repeating the heating at 1,200° C. and the cooling to room temperature 20 times.

EXAMPLE 3

A disc of 10 mm in diameter and 3 mm in thickness was made from a silicon carbide hot press sintered body containing B and C, and subjected to a surface roughening with #400 SiC abrasive grits to form a substrate for slurry-applied coating. The one side of the substrate was coated with a slurry obtained by suspending a coating agent shown in the following Table 3 and polyvinyl alcohol as a molding aid in water, dried and heated at 1,500° C. in a nitrogen atmosphere for 1 hour to form a baked layer having a thickness of 80-90 μm, whereby samples 8 and 9 for the measurement of thermal conductivity in the silicon carbide sintered member according to the invention were obtained. The thermal conductivity was measured by the same method as described in Example 1 with respect to the samples 8 and 9 together with a substrate coated with no zirconia as Comparative Example 10 to obtain results as shown in Table 3.

TABLE 3

| Sample | No. | Coating agent | Thermal conductivity (cal/cm · sec · °C.) room temperature | 800° C. |
|---|---|---|---|---|
| Invention product | 8 | 5 wt % MgO—ZrO$_2$ | 0.05 | 0.04 |
| Invention product | 9 | 10 wt % Y$_2$O$_3$—ZrO$_2$ | 0.06 | 0.04 |
| Comparative Example | 10 | no coating of ZrO$_2$ | 0.19 | 0.13 |

In the products 8 and 9 according to the invention, the peeling or crazing was not caused even by repeating the heating at 1,200° C. and the cooling to room temperature 20 times.

As shown in Tables 1, 2 and 3, the silicon carbide sintered member coated with zirconia according to the invention is low in the thermal conductivity and excellent in the heat insulating properties.

As mentioned above, the zirconia-coated silicon carbide sintered members according to the invention simultaneously possess the high-temperature strength inherent to silicon carbide sintered member and the heat insulating properties inherent to zirconia, so that when they are applied to high-temperature structural members such as engine parts and the like, the heat resistance and heat insulating properties can be simultaneously improved and consequently the invention has great merits in industry.

What is claimed is:

1. A silicon carbide sintered member, consisting essentially of:
    a silicon carbide sintered body; and
    a heat insulating layer formed on a surface of said silicon carbide sintered body, said layer consisting essentially of zirconia and having a thickness of not greater than 100 microns;
    wherein said heat insulating layer reduces the thermal conductivity of said silicon carbide sintered member.

2. The silicon carbide sintered member according to claim 1, wherein said thickness is not greater than 70 microns.

3. The silicon carbide sintered member according to claim 1, further comprising an intermediate layer formed between said silicon carbide sintered body and said heat insulating layer, wherein said intermediate layer has a thermal expansion coefficient between that of the silicon carbide sintered body and that of the heat insulating layer.

4. The silicon carbide sintered member according to claim 1, wherein said silicon carbide sintered body further comprises additives selected from the group consisting of B, C, Be and Al.

5. The silicon carbide sintered member according to claim 1, wherein said zirconia is stabilized with at least one additive selected from the group consisting of Y$_2$O$_3$, MgO and CaO.

6. The silicon carbide sintered member according to claim 1, wherein said zirconia is partially stabilized with at least one additive selected from the group consisting of $Y_2O_3$, MgO and CaO.

7. The silicon carbide sintered member according to claim 1, further comprising a thermal conductivity of not greater than 0.06 cal/cm.sec.°C.

8. A silicon carbide sintered member, consisting essentially of:
   a silicon carbide sintered body; and
   a heat insulating layer formed on a roughened or activated surface of said silicon carbide body by plasma spraying, said layer consisting essentially of zirconia and having a thickness of not greater than 100 microns;
   wherein siad heat insulating layer is rigidly adhered to said body, such that said layer reduces the thermal conductivity of said silicon carbide sintered member.

9. The silicon carbide sintered member according to claim 8, where said thickness is not greater than 70 microns.

10. The silicon carbide sintered member of claim 8, further comprising an intermediate layer formed between said silicon carbide sintered body and said heat insulating layer, wherein said intermediate layer has a thermal expansion coefficient between that of the silicon carbide sintered body and that of the heat insulating layer.

11. The silicon carbide sintered member according to claim 8, wherein said silicon carbide sintered body further comprises additives selected from the group consisting of B, C, Be and Al.

12. The silicon carbide sintered member according to claim 8, wherein said zirconia is stabilzed with at least one additive selected from the group consisting of $Y_2O_3$, MgO and CaO.

13. The silicon carbide sintered member according to claim 8, wherein said zirconia is partially stabilized with at least one additive selective from the group consisting of $Y_2O_3$, MgO and CaO.

14. The silicon carbide sintered member according to claim 8, further comprising a thermal conductivity of not greater than 0.06 cal/cm.sec.°C.

* * * * *